United States Patent

Okuzono

(10) Patent No.: US 9,763,032 B2
(45) Date of Patent: Sep. 12, 2017

(54) INFORMATION PROCESSING APPARATUS THAT PERFORMS SHORT-RANGE WIRELESS COMMUNICATION, METHOD OF CONTROLLING THE SAME, AND STORAGE MEDIUM

(71) Applicant: CANON KABUSHIKI KAISHA, Tokyo (JP)

(72) Inventor: Ryotaro Okuzono, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/132,752

(22) Filed: Apr. 19, 2016

(65) Prior Publication Data

US 2016/0316316 A1 Oct. 27, 2016

(30) Foreign Application Priority Data

Apr. 22, 2015 (JP) .................................. 2015-087663

(51) Int. Cl.
*H04W 4/00* (2009.01)
*H04W 76/02* (2009.01)
*H04B 5/00* (2006.01)

(52) U.S. Cl.
CPC .......... *H04W 4/008* (2013.01); *H04B 5/0031* (2013.01); *H04W 76/023* (2013.01)

(58) Field of Classification Search
CPC . H04W 4/008; H04W 76/023; H04W 52/286; H04B 5/0031
See application file for complete search history.

(56) References Cited

U.S. PATENT DOCUMENTS

| 5,568,643 | A  | * | 10/1996 | Tanaka | ..................... | G06F 13/24 710/260 |
| 6,213,879 | B1 | * | 4/2001  | Niizuma | ............... | H04L 7/0008 341/50 |
| 8,199,880 | B2 | * | 6/2012  | Yamada | ..................... | A61B 6/00 378/114 |
| 2005/0254456 | A1 | * | 11/2005 | Sakai | ..................... | H04L 1/0041 370/328 |
| 2006/0187961 | A1 | * | 8/2006 | Kai | ..................... | H04L 63/0428 370/469 |

(Continued)

FOREIGN PATENT DOCUMENTS

JP 2012068748 A 4/2012

*Primary Examiner* — Andrew Wendell
(74) *Attorney, Agent, or Firm* — Rossi, Kimms & McDowell LLP

(57) ABSTRACT

An information processing apparatus capable of notifying a user of a state of data transmission via short-range wireless communication. An NFC tag controller of an MFP as an information processing apparatus holds communication setting information for wireless LAN communication, and transmits the communication setting information to a mobile terminal as an external apparatus, via NFC communication by dividing the information. An interrupt signal generated by the NFC tag controller for notifying completion of transmission of a divided information item to the mobile terminal is detected, and when the number of times of detection of the interrupt signal reaches a predetermined number of times, the user is notified that the transmission of the communication setting information is completed.

12 Claims, 15 Drawing Sheets

(56) References Cited

U.S. PATENT DOCUMENTS

| | | | |
|---|---|---|---|
| 2007/0160037 A1* | 7/2007 | Matsui | G06F 13/4059 370/379 |
| 2008/0067249 A1* | 3/2008 | Nakatsugawa | G06Q 20/32 235/451 |
| 2016/0132369 A1* | 5/2016 | Lee | G06F 1/3296 713/2 |
| 2016/0266846 A1* | 9/2016 | Horiguchi | G06F 3/0656 |

* cited by examiner

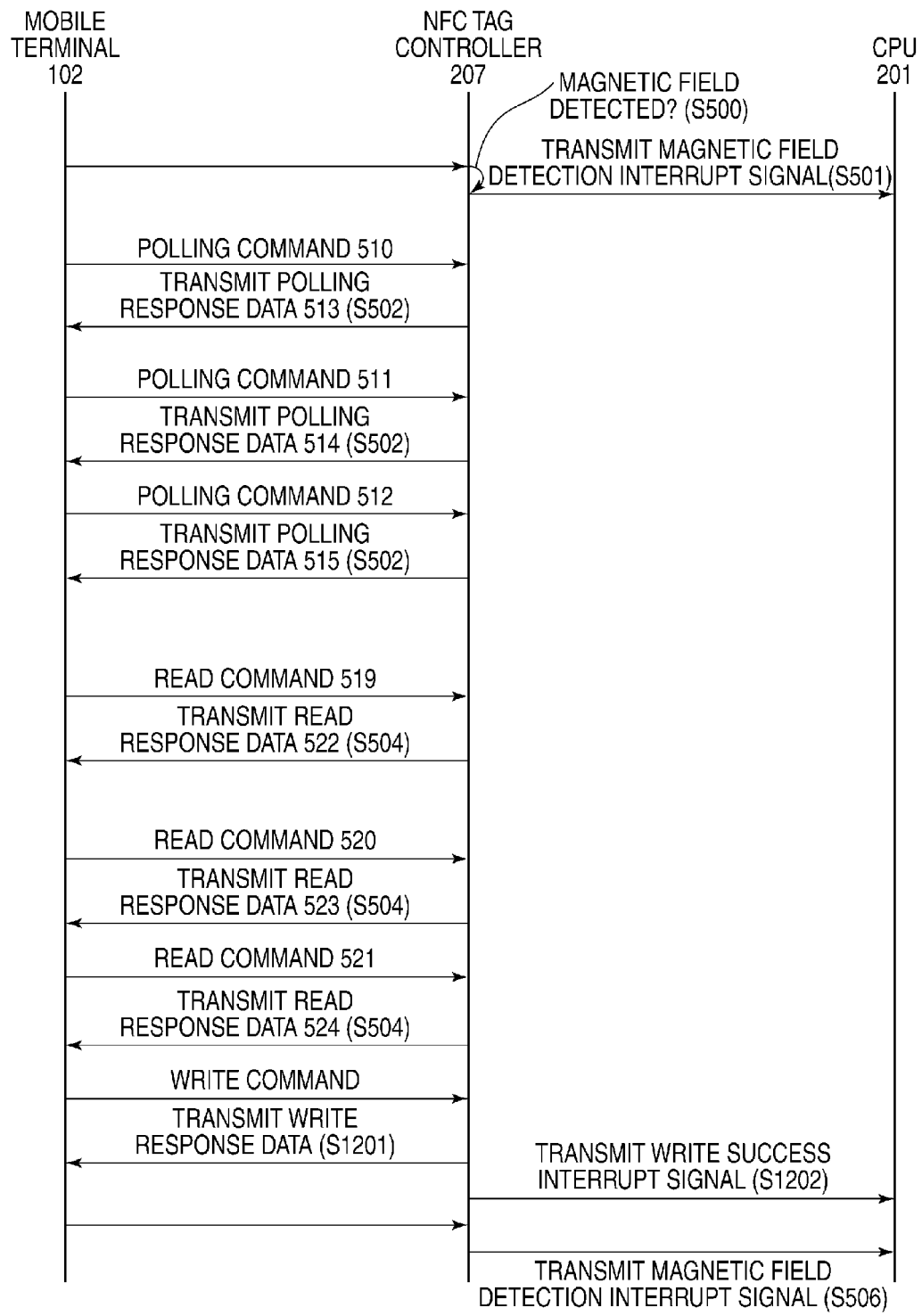

INFORMATION PROCESSING APPARATUS THAT PERFORMS SHORT-RANGE WIRELESS COMMUNICATION, METHOD OF CONTROLLING THE SAME, AND STORAGE MEDIUM

BACKGROUND OF THE INVENTION

Field of the Invention

The present invention relates to an information processing apparatus that performs short-range wireless communication, a method of controlling the same, and a storage medium.

Description of the Related Art

In recent years, there has been known an MFP, as an information processing apparatus, which is equipped with a tag IC for performing short-range wireless communication using RFID (Radio Frequency Identification), NFC (Near Field Communication), or the like. The tag IC stores communication setting information for making communication settings between devices, such as communication settings for wireless LAN communication using Wi-Fi with which it is possible to perform larger-volume data communication than the short-range wireless communication. When a user holds e.g. a mobile terminal, which is an external apparatus having a short-range wireless communication function, over the above-mentioned tag IC, the short-range wireless communication is performed between the tag IC and the mobile terminal, whereby the communication setting information stored in the tag IC is transmitted to the mobile terminal from the tag IC (see e.g. Japanese Patent Laid-Open Publication No. 2012-068748). The mobile terminal configures communication settings for wireless LAN communication with the MFP, based on the transmitted communication setting information, and transmits large-volume print data for performing print processing to the MFP by wireless LAN communication.

Here, large-volume data communication cannot be performed by short-range wireless communication, and hence when transmitting the communication setting information, which has a relatively large volume, the tag IC divides the communication setting information into a plurality of divided data items. Then, when transmission request notifications corresponding to the respective divided data items, which are transmitted from the mobile terminal, are received, the tag IC transmits the divided data items in response to the transmission request notifications, respectively. In doing this, the tag IC transmits a response notification that a response has been made to each transmission request notification, to a CPU provided in the MFP in accordance with transmission of each divided data item.

Although the CPU can judge that the tag IC has transmitted the responses to the respective transmission request notifications using the received response notifications, it cannot judge whether or not all of the divided data items, i.e. all of the communication setting information, has been transmitted to the mobile terminal. As a result, the MFP cannot notify the user of a state of transmission of the communication setting information to the mobile terminal.

SUMMARY OF THE INVENTION

The present invention provides an information processing apparatus that is capable of notifying a user of a state of data transmission performed via short-range wireless communication, a method of controlling the same, and a storage medium.

In a first aspect of the present invention, there is provided an information processing apparatus comprising a short-range wireless communication unit configured to perform short-range wireless communication, wherein the short-range wireless communication unit holds data and transmits the data to an external apparatus by dividing the data, a detection unit configured to detect an interrupt signal generated by the short-range wireless communication unit, the interrupt signal indicating that the short-range wireless communication unit has transmitted a divided data item of the data to the external apparatus, and a notification unit configured to notify a user that transmission of the data is completed, in a case where the number of times of detection of the interrupt signal by the detection unit reaches a predetermined number of times.

In a second aspect of the present invention, there is provided a method of controlling an information processing apparatus including a short-range wireless communication unit configured to hold data and perform short-range wireless communication, comprising transmitting the data to an external apparatus by dividing the held data, detecting an interrupt signal generated by the short-range wireless communication unit, the interrupt signal indicating that the short-range wireless communication unit has transmitted a divided data item of the data to the external apparatus, and notifying a user that transmission of the data is completed, in a case where the number of times of detection of the interrupt signal reaches a predetermined number of times.

In a third aspect of the present invention, there is provided a non-transitory computer-readable storage medium storing a computer-executable program for executing a method of controlling an information processing apparatus including a short-range wireless communication unit configured to hold data and perform short-range wireless communication, wherein the method comprises transmitting the data to an external apparatus by dividing the held data, detecting an interrupt signal generated by the short-range wireless communication unit, the interrupt signal indicating that the short-range wireless communication unit has transmitted a divided data item of the data to the external apparatus, and notifying a user that transmission of the data is completed, in a case where the number of times of detection of the interrupt signal reaches a predetermined number of times.

According to the present invention, it is possible to notify a user of an execution state of data transmission via short-range wireless communication.

Further features of the present invention will become apparent from the following description of exemplary embodiments (with reference to the attached drawings).

BRIEF DESCRIPTION OF THE DRAWINGS

FIG. 12 is a sequence diagram useful in explaining a process for transmitting pairing data via NFC communication, which is performed between the MFP as an information processing apparatus according to a second embodiment of the present invention and the mobile terminal.

DESCRIPTION OF THE EMBODIMENTS

The present invention will now be described in detail below with reference to the accompanying drawings showing embodiments thereof.

Figure 1:
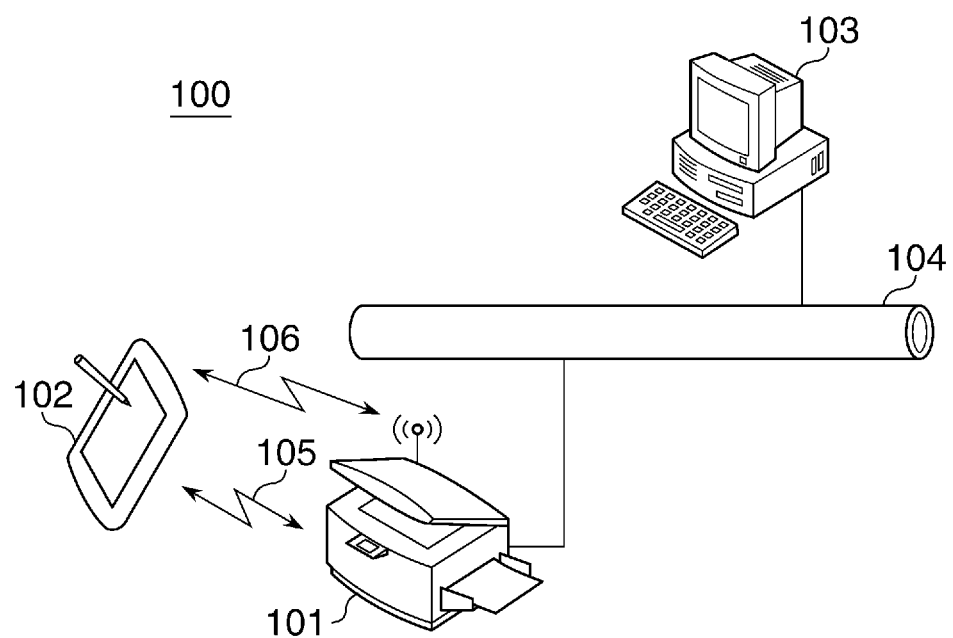
FIG. 1 is a schematic network diagram of a communication system including an MFP as an information processing apparatus according to a first embodiment of the present invention.

FIG. 1 is a schematic network diagram of a communication system 100 including an MFP 101 as an information processing apparatus according to a first embodiment of the present invention.

Referring to FIG. 1, the communication system 100 includes the MFP 101 (information processing apparatus), a mobile terminal 102 as an external apparatus, and a client PC 103, and the MFP 101 and the client PC 103 are connected to each other via a wired LAN 104.

The MFP 101 has a copy function, a print function, a scan function, a data communication function, and so forth. The data communication function includes a function for performing short-range wireless communication using NFC or RFID, and a function for performing wireless communication using Wi-Fi or Bluetooth (registered trademark). Examples of the mobile terminal 102 include a smartphone and a tablet PC, and the mobile terminal 102 has the above-mentioned data communication function. In the present embodiment, the MFP 101 performs short-range wireless communication 105 using e.g. NFC (hereinafter referred to as the "NFC communication") with the mobile terminal 102 to thereby transmit communication setting information for use in configuring communication settings for wireless LAN communication 106, to the mobile terminal 102, and the mobile terminal 102 configures the communication settings for the wireless LAN communication 106, based on the transmitted communication setting information. The MFP 101 and the mobile terminal 102 are capable of performing large-volume data communication via the wireless LAN communication 106 for which the communication settings have been configured. The client PC 103 transmits data for performing various processing, such as print data for performing print processing, to the MFP 101.

Figure 2:
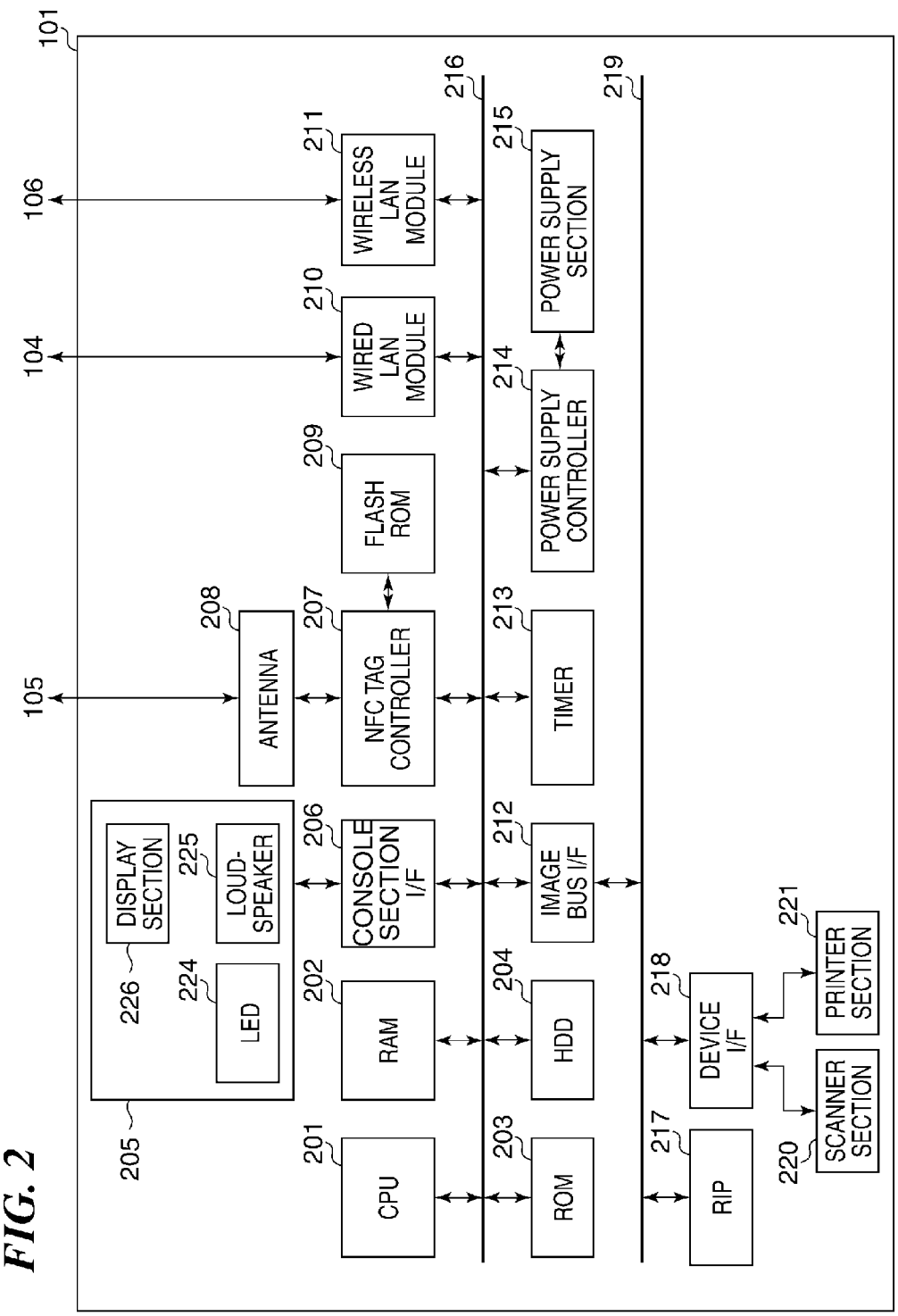
FIG. 2 is a schematic block diagram of the MFP appearing in FIG. 1.

FIG. 2 is a schematic block diagram of the MFP 101 appearing in FIG. 1.

Referring to FIG. 2, the MFP 101 includes, as components, a CPU 201, a RAM 202, a ROM 203, an HDD 204, a console section interface 206, an NFC tag controller (short-range wireless communication unit) 207, a wired LAN module 210, a wireless LAN module 211, an image bus interface 212, a timer 213, and a power supply controller 214. These components are interconnected via a system bus 216. The MFP 101 also includes a console section 205, an antenna 208, a flash ROM 209, and a power supply section 215. The console section 205 is connected to the console section interface 206, the antenna 208 and the flash ROM 209 are connected to the NFC tag controller 207, and the power supply section 215 is connected to the power supply controller 214. The MFP 101 further includes a RIP 217 and a device interface 218, and the image bus interface 212, the RIP 217, and the device interface 218 are interconnected via an image bus 219. Further, the MFP 101 includes a scanner section 220 and a printer section 221, and the scanner section 220 and the printer section 221 are connected to the device interface 218.

The CPU 201 controls the overall operation of the MFP 101. The RAM 202 stores various control programs executed by the CPU 201. Further, the RAM 202 is used as a work area for the CPU 201, and temporarily stores data used for various processing performed by the CPU 201. The ROM 203 stores e.g. a boot program used to start the MFP 101. The HDD 204 stores software and various data for the control of the MFP 101. The console section 205 includes an LED 224, a loudspeaker 225, a display section 226, and hardware keys, not shown, and performs data communication with the CPU 201 via the console section interface 206. The LED 224 can be controlled to be lighted on and off, the loudspeaker 225 is capable of outputting a plurality of types of sound, and the display section 226 is comprised of an LCD and a touch panel and displays various screens. The MFP 101 is capable of notifying a user of various information by using the LED 224, the loudspeaker 225, and the display section 226. In the present embodiment, a setting screen 300, shown in FIG. 3A, for making various settings is displayed on the display section 226. The setting screen 300 includes display areas 301 to 303 and various operation buttons. The display area 301 shows setting items selected by a user in a hierarchical structure, the display area 302 shows a selection button 304 corresponding to the display area 301, and the display area 303 shows a message concerning a state of setting of the setting items selected by the user. For example, when the user presses the selection button 304 in a case where the selection button 304 corresponds to a pairing setting for pairing the MFP 101 with the mobile terminal 102, a pairing setting screen 305 shown in FIG. 3B is displayed. The pairing setting screen 305 includes an enable button 306 for enabling the pairing and a disable button 307 for disabling the pairing, and the user configures the pairing setting by pressing one of the enable button 306 and the disable button 307.

The NFC tag controller 207 performs the NFC communication 105 with the mobile terminal 102 having the NFC communication function, and transmits pairing data stored in the flash ROM 209 to the mobile terminal 102. The pairing data contains identification information enabling identification of the pairing data, attribute information indicative of a description language used in the pairing data, communication setting information for configuring communication settings for wireless LAN communication, and so forth. Further, the NFC tag controller 207 transmits an interrupt signal notifying that a response to any of various request notifications transmitted from the mobile terminal 102 has been performed, to the CPU 201. The flash ROM 209 stores the pairing data transmitted from the CPU 201. The wired LAN module 210 performs data communication with the client PC 103 connected via the wired LAN 104. The wireless LAN module 211 performs data communication with the mobile terminal 102 via the wireless LAN communication 106 for which communication settings have been made based on the communication setting information contained in the pairing data acquired via the NFC communication 105. The image bus interface 212 performs data communication with the components connected via the image bus 219. The timer 213 performs counting based on a control signal delivered from the CPU 201. The power supply controller 214 controls power supplied from the power supply section 215. The power supply section 215 supplies electric power to the components provided in the MFP 101 based on a control signal delivered from the power supply controller 214.

The RIP 217 is a raster image processor (RIP), and converts a page description language (PDL) code or a display list into bitmap image data. The device interface 218 performs data communication with the scanner section 220 and the printer section 221. The scanner section 220 reads image information from an original set on an original platen glass, not shown, and generates image data based on the read image information. The printer section 221 performs printing on a sheet based on print data transmitted from the client PC 103 or the image data generated by the scanner section 220.

Figure 4:
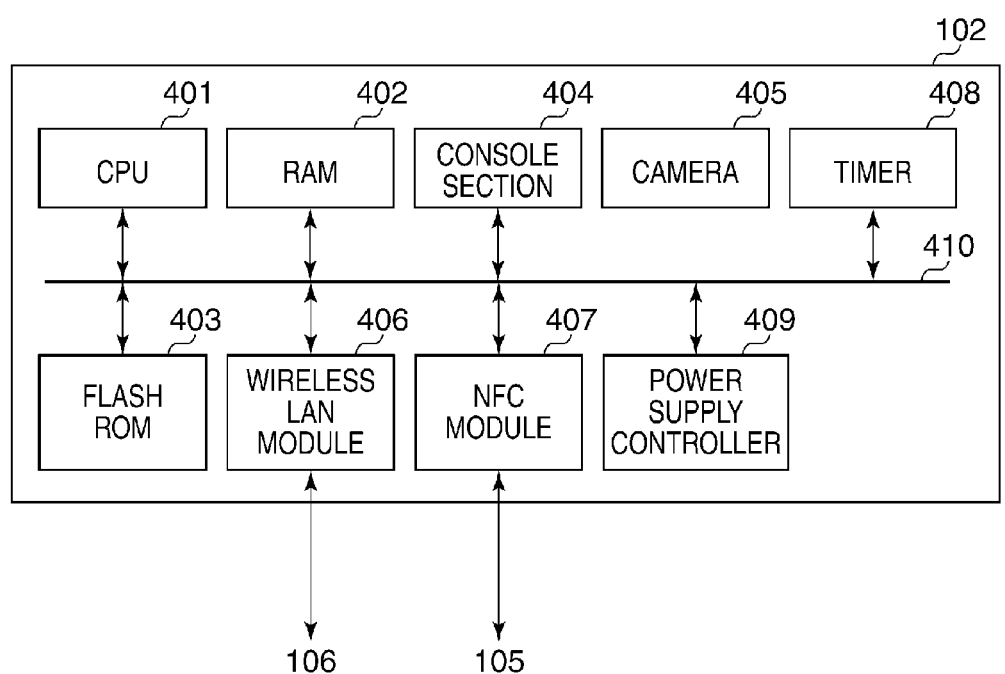
FIG. 4 is a schematic block diagram of a mobile terminal appearing in FIG. 1.

FIG. 4 is a schematic block diagram of the mobile terminal 102 appearing in FIG. 1.

Referring to FIG. 4, the mobile terminal 102 includes, as components, a CPU 401, a RAM 402, a flash ROM 403, a console section 404, a camera 405, a wireless LAN module 406, an NFC module 407, a timer 408, and a power supply controller 409. These components are interconnected via a system bus 410.

The CPU 401 controls the overall operation of the mobile terminal 102. The RAM 402 stores various control programs executed by the CPU 401. Further, the RAM 402 is used as a work area for the CPU 401, and temporarily stores data used for various processing performed by the CPU 401. The flash ROM 403 stores various control programs executed by the CPU 401 and various data. The console section 404 is comprised of an LCD and a touch panel, none of which are shown, and transmits input information input by operating the console section 404, to the CPU 401. The camera 405 performs photographing of a still image and a moving image. The wireless LAN module 406 performs data communication with the MFP 101 via the wireless LAN communication 106. The NFC module 407 performs data communication with the MFP 101 via the NFC communication 105, and acquires e.g. pairing data from the MFP 101 via the NFC communication 105. The timer 108 performs counting based on a control signal transmitted from the CPU 401. The power supply controller 409 controls power supplied to the components provided in the mobile terminal 102.

Figure 5:
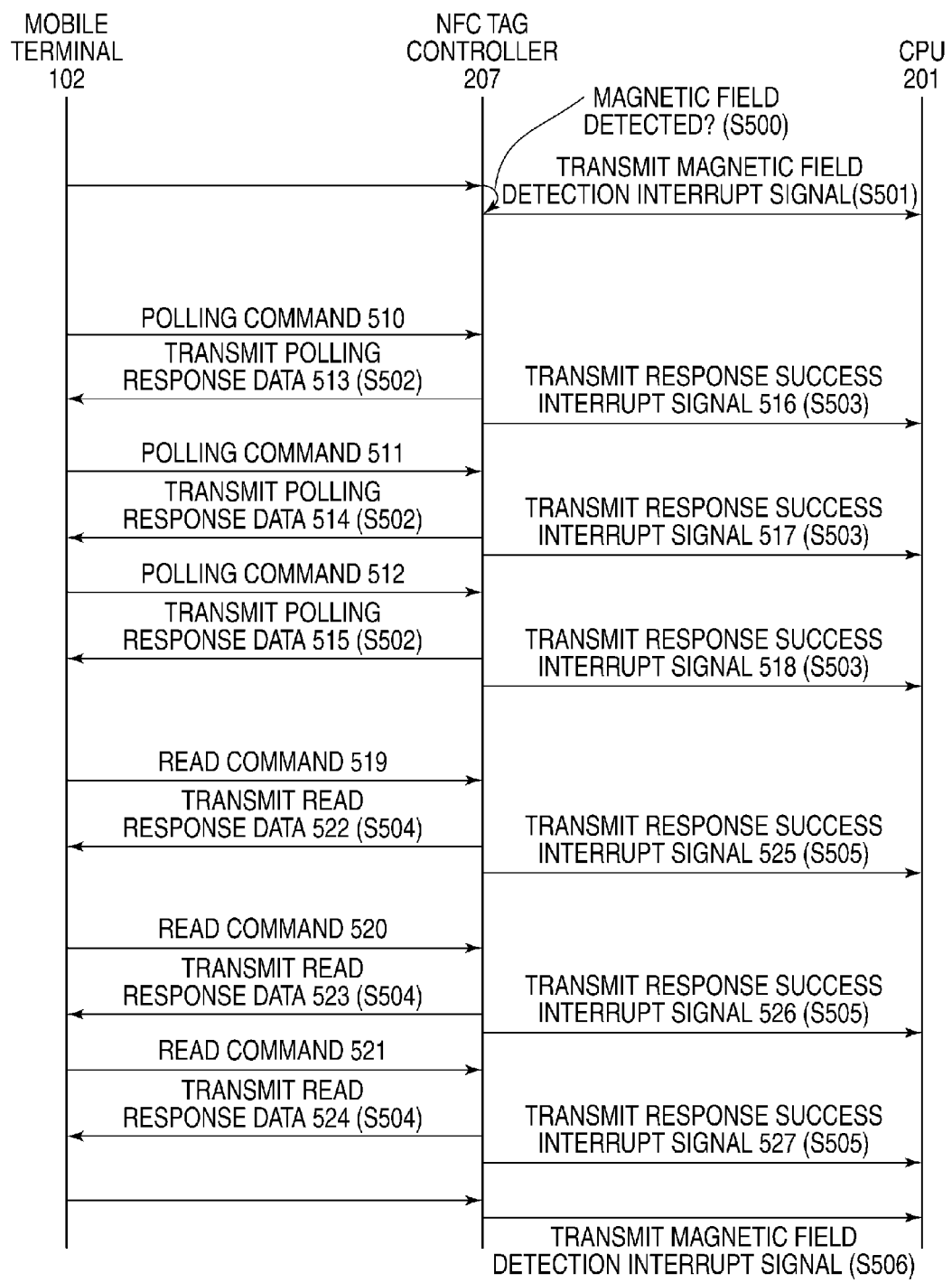
FIG. 5 is a sequence diagram useful in explaining a process for transmitting pairing data via NFC communication, which is performed between the MFP and the mobile terminal.

FIG. 5 is a sequence diagram useful in explaining a process for transmitting pairing data via the NFC communication 105, which is performed between the MFP 101 and the mobile terminal 102 appearing in FIG. 1.

In the process for transmitting pairing data in FIG. 5, it is assumed that the NFC tag controller 207 of the MFP 101 generates a magnetic field detection interrupt signal and a response success interrupt signal, described hereinafter, based on setting information set in advance.

Referring to FIG. 5, first, when the NFC tag controller 207 detects via the antenna 208 a magnetic field caused by radio waves transmitted from the mobile terminal 102 for performing the NFC communication 105 (step S500), the NFC tag controller 207 generates a magnetic field detection interrupt signal notifying that a magnetic field has been detected, and transmits the generated magnetic field detection interrupt signal to the CPU 201 (step S501). Then, when the NFC tag controller 207 receives polling commands (execution request notifications) which are transmitted from the mobile terminal 102 to request execution of processing for reading identification information contained in the pairing data, the NFC tag controller 207 transmits polling response data items including the identification information, in response to the received pooling commands, respectively (step S502). More specifically, as the polling commands transmitted by the mobile terminal 102 to request execution of processing for reading tag identification information, a polling command 510 which requests card identification information, a polling command 511 which requests a system code using a wildcard, and a polling command 512 which requests a system code as a designated system code are transmitted to the NFC tag controller 207. The NFC tag controller 207 transmits polling response data items 513 to 515 including the identification information and respectively responsive to the polling commands 510 to 512, to the mobile terminal 102. The NFC tag controller 207 generates, in accordance with the transmission of each of the polling response data 513 to 515, a corresponding one of response success interrupt signals 516 to 518 (response notifications) notifying that the transmission of each of the polling response data 513 to 515 is normally completed, and transmits each of the generated response success interrupt signals 516 to 518 to the CPU 201 (step S503).

Then, the NFC tag controller 207 determines whether or not each of read commands (execution request notifications) requesting execution of processing for reading out attribute information and communication setting information, which are contained in the pairing data, has been received from the mobile terminal 102. Upon receipt of the read commands requesting processing for reading out the information from the pairing data from the mobile terminal 102, the NFC tag controller 207 transmits read response data items including the communication setting information, in response to the received read commands, respectively (step S504).

Incidentally, the maximum size of data that can be transmitted via the NFC communication 105 is normally 256 bytes. In accordance with this, in the case of performing data communication with more than 256 bytes, the data to be transmitted is divided into data items each having a size not larger than 256 bytes, and the divided data items are separately transmitted. In the present embodiment, it is assumed, by way of example, that the communication setting information has a data size which is larger than 256 bytes and smaller than 512 bytes, and the communication setting information is divided into a plurality of, e.g. two data items each having a size not larger than 256 bytes. Read commands 520 and 521, referred to hereinafter, which correspond to the two divided data items, respectively, are transmitted from the mobile terminal 102 to the NFC tag controller 207. More specifically, a read command 519 requesting the attribute information, and the read commands 520 and 521 requesting the divided communication setting information items, respectively, are transmitted to the NFC tag controller 207, and the NFC tag controller 207 transmits read response data items 522 to 524 containing the attribute information and the two divided communication setting information items which are requested by the read commands 519 to 521, respectively, to the mobile terminal 102.

The NFC tag controller 207 generates, in accordance with the transmission of each of the read response data items 522 to 524, a corresponding one of response success interrupt signals 525 to 527 (response notifications) notifying that the transmission of each of the read response data items 522 to 524 is normally completed, and transmits each of the generated response success interrupt signals 525 to 527 to the CPU 201 (step S505). Then, if neither a polling command nor a read command is received for a predetermined time period, the NFC tag controller 207 generates a magnetic field detection interrupt signal, and transmits the generated magnetic field detection interrupt signal to the CPU 201 (step S506), followed by terminating the present process.

Next, a description will be given of a pairing setting process and a notification process.

Here, the CPU 201 is capable of judging that the transmission of the read response data items 522 to 524 is normally completed, based on the response success interrupt signals 525 to 527 transmitted from the NFC tag controller 207, but the read response data items 522 to 524 only contain the attribute information and the two divided communication setting information items, respectively, which are contained in the pairing data, and are each a so-called part of the pairing data. Therefore, although the CPU 201 can judge that transmission of each of the read response data items 522 to 524 is normally completed, it is impossible for the CPU 201 to determine from this fact whether or not the whole pairing data has been transmitted to the mobile terminal 102. As a result, the MFP 101 cannot notify the user of a state (execution state) of transmission of the pairing data to the mobile terminal 102.

To solve this problem, in the present embodiment, the required number of times of generation of a response success interrupt signal (number of notifications) each associated with the transmission of a corresponding read response data item is counted, and it is determined, based on the counted number of times of generation of a response success interrupt signal, that the transmission of the pairing data is completed, and it is notified that the transmission of the pairing data is completed.

Figure 6:
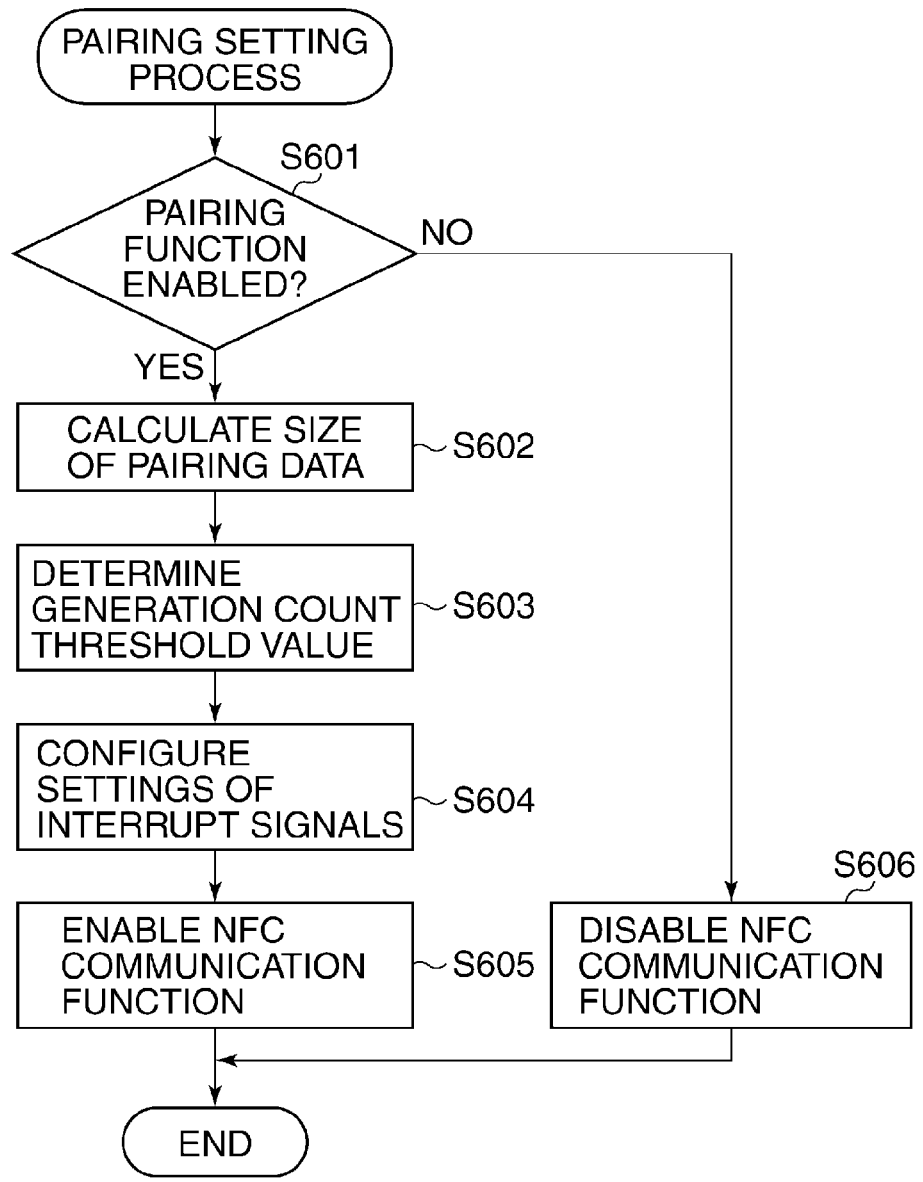
FIG. 6 is a flowchart of a pairing setting process performed by the MFP.

FIG. 6 is a flowchart of the pairing setting process performed by the MFP 101 appearing in FIG. 1.

The pairing setting process in FIG. 6 is performed by the CPU 201 that executes the control program stored in the ROM 203 and software stored in the HDD 204, and it is assumed in this process as well that the NFC tag controller 207 generates a magnetic field detection interrupt signal and a response success interrupt signal, based on the setting information set in advance.

Figure 3A:
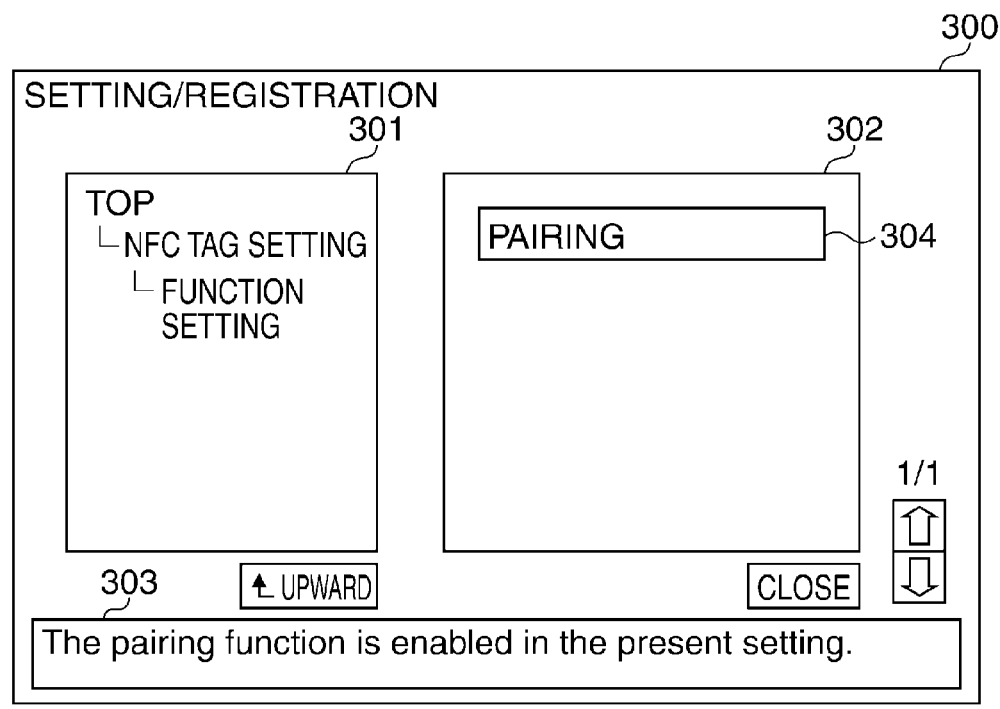
FIG. 3A is a diagram showing a setting screen displayed on a display section of the MFP shown in FIG. 2.
Figure 3B:
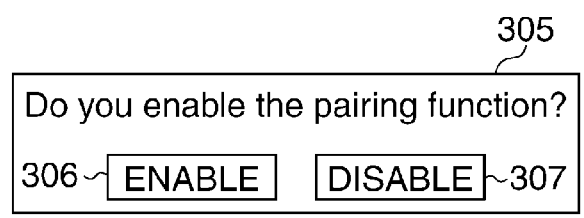
FIG. 3B is a diagram showing a pairing setting screen displayed on the display section.

Referring to FIG. 6, first, the CPU 201 determines based on the pairing setting set on the screen shown in FIG. 3A whether or not the pairing function is enabled (step S601).

If it is determined in the step S601 that the pairing function is enabled, the CPU 201 calculates the total size of the pairing data (step S602). Then, the CPU 201 determines, based on the calculated size of data, a threshold value (specified value) of the number of times of generation of a response success interrupt signal (hereinafter referred to as the "generation count threshold value") for use in the notification process in FIGS. 8A and 8B, described herein-after (step S603), and stores the determined generation count threshold value in the RAM 202. Here, in the NFC communication 105, the amount of information of the identification information and the attribute information to be transmitted is fixed, and hence the total number of times of generation of each of the response success interrupt signals 516 to 518 and 525, which is associated with the transmission of a corresponding one of the polling response data 513 to 515 and the read response data 522 for transmitting all of the identification information and the attribute information, can be predicted in advance. On the other hand, the amount of information of the communication setting information to be transmitted is not fixed and the size of data of the communication setting information is relatively large. Therefore, the total number of times of generation of each of response success interrupt signals, which is associated with the transmission of a corresponding one of the read response data items for transmitting all of the communication setting information, cannot be predicted.

To cope with this, in the present embodiment, the total number of times of generation of each of response success interrupt signals required to transmit the whole communication setting information the amount of which cannot be predicted is calculated based on the total size of the pairing data, and the generation count threshold value is determined based on the calculated total number of times of generation of each of the response success interrupt signals concerning the communication setting information (hereinafter referred to as the "calculated generation count") and the total number of times of generation of each of the response success interrupt signals 516 to 518 and 525 required to transmit all of the identification information and the attribute information, which can be predicted in advance, (hereinafter referred to as the "predictable generation count"). For example, assuming that the pairing data has a data size of 256 to 512 bytes, the calculated generation count is equal to 2, and as indicated by the transmitted response success interrupt signals 516 to 518 and 525 appearing in FIG. 5, the predictable generation count is equal to 4 irrespective of the amount of data of the pairing data. Therefore, the generation count threshold value becomes equal to 6.

Then, the CPU 201 transmits the pairing data to the NFC tag controller 207, and the pairing data is stored in the flash ROM 209 by the NFC tag controller 207. Next, the CPU 201 configures the settings of interrupt signals such that a magnetic field detection interrupt signal and a response success interrupt signal are transmitted from the NFC tag controller 207 (step S604), and sets the NFC tag controller 207 to enable the NFC communication function (step S605). This enables the NFC tag controller 207 to perform the NFC communication 105 with the mobile terminal 102 having the NFC communication function. Then, the CPU 201 terminates the present process.

If it is determined in the step S601 that the pairing function is disabled, the CPU 201 sets the NFC tag controller 207 to disable the NFC communication function (step S606), followed by terminating the present process.

Figure 7:
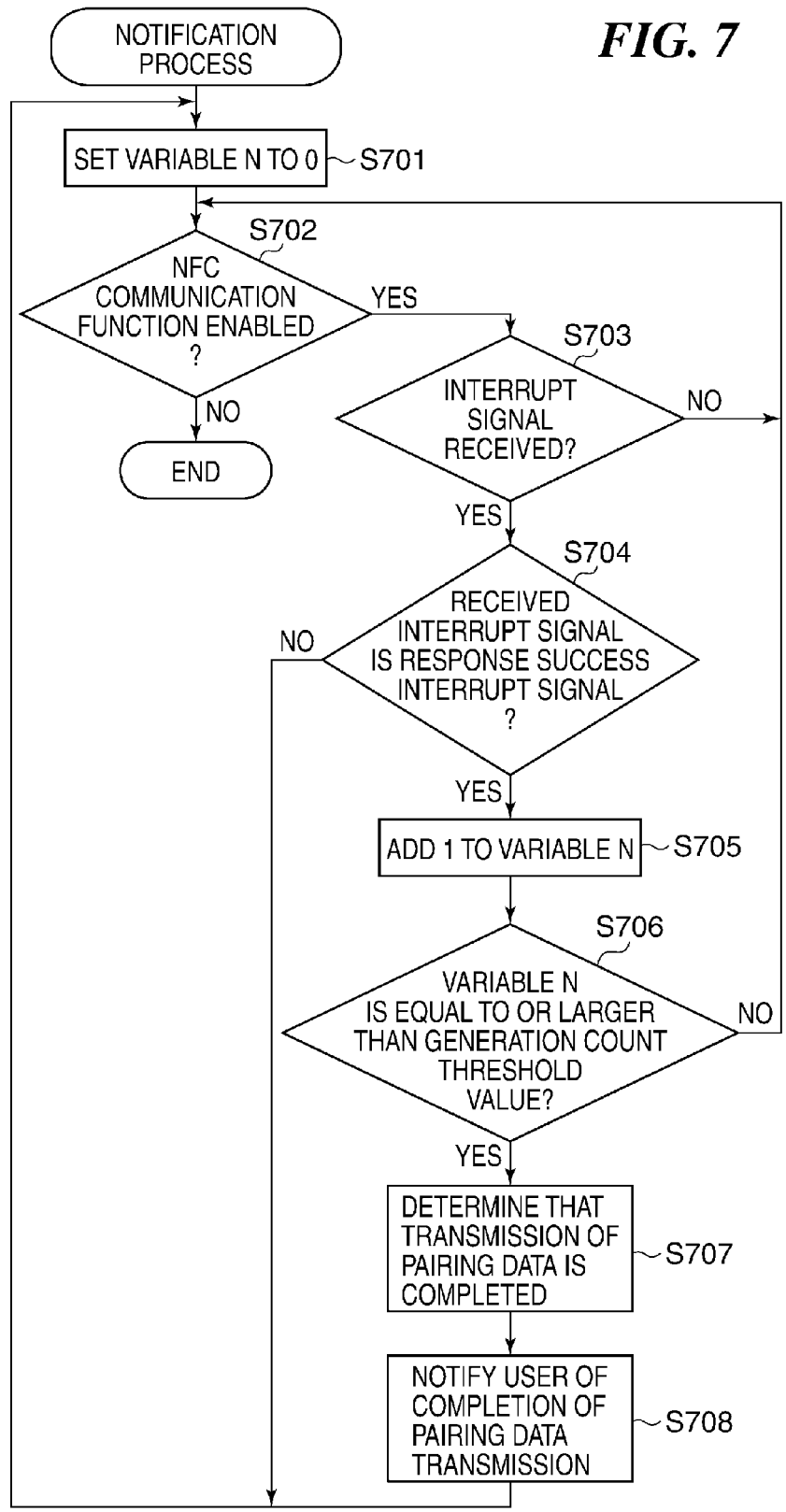
FIG. 7 is a flowchart of a notification process performed by the MFP.

FIG. 7 is a flowchart of the notification process performed by the MFP 101.

The notification process in FIG. 7 is performed by the CPU 201 that executes the control program stored in the ROM 203 and the software stored in the HDD 204, and it is assumed in this process as well that the NFC tag controller 207 generates a magnetic field detection interrupt signal and a response success interrupt signal, based on the setting information set in advance. Further, this process is performed assuming that the step S603 in FIG. 6 has been executed and the generation count threshold value is stored in the RAM 202.

Referring to FIG. 7, first, the CPU 201 sets a variable N indicative of the number of times of generation of a response success interrupt signal to 0 (step S701). Then, the CPU 201 determines whether or not the NFC communication function of the NFC tag controller 207 is enabled (step S702).

If it is determined in the step S702 that the NFC communication function of the NFC tag controller 207 is enabled, the CPU 201 determines whether or not an interrupt signal has been received from the NFC tag controller 207 (step S703).

If it is determined in the step S703 that an interrupt signal has not been received from the NFC tag controller 207, the CPU 201 returns to the step S702, whereas if it is determined in the step S703 that an interrupt signal has been received from the NFC tag controller 207, the CPU 201 determines whether or not the received interrupt signal is a response success interrupt signal (step S704).

If it is determined in the step S704 that the received interrupt signal is not a response success interrupt signal, for example, if the received interrupt signal is a magnetic field detection interrupt signal, the CPU 201 returns to the step S701.

If it is determined in the step S704 that the received interrupt signal is a response success interrupt signal, the CPU 201 adds 1 to the variable N (step S705), and determines whether or not the variable N is equal to or larger than the generation count threshold value calculated in the step S603 in FIG. 6 (step S706).

Figure 8A:
FIG. 8A is a diagram showing a display screen displayed on the display section, for notifying that the transmission of pairing data is completed.

If it is determined in the step S706 that the variable N is equal to or larger than the generation count threshold value, the CPU 201 judges that the transmission of the pairing data (data communication processing) is completed (step S707), displays a display screen 800 shown in FIG. 8A on the display section 226 to thereby notify the user of completion of the transmission of the pairing data (step S708), and returns to the step S701.

If it is determined in the step S706 that the variable N is smaller than the generation count threshold value, the CPU 201 judges that the transmission of the pairing data including the communication setting information is not completed, and returns to the step S702 without displaying the notification of completion of the data transmission on the display section 226.

If it is determined in the step S702 that the NFC communication function of the NFC tag controller 207 is disabled, the CPU 201 terminates the present process.

According to the pairing setting process in FIG. 6 and the notification process in FIG. 7 described above, the number of times of generation of a response success interrupt signal is counted, and the counted number of times of generation of a response success interrupt signal is compared with the generation count threshold value. If it is determined based on a result of the comparison that the transmission of the pairing data is completed, it is notified that the transmission of the pairing data is completed. That is, it is possible to notify the user that the transmission of the pairing data via the NFC communication 105 is completed, by using the counted number of times of generation of a response success interrupt signal.

Further, according to the pairing setting process in FIG. 6 and the notification process in FIG. 7 described above, the generation count threshold value is determined based on the total size of the pairing data, and if the variable N is equal to or larger than the generation count threshold value, it is judged that the transmission of the pairing data is completed. This makes it possible to reliably notify the user that the transmission of the pairing data via the NFC communication 150 is completed, irrespective of the total size of the pairing data.

According to the above-described notification process in FIG. 7, the display screen 800 is displayed on the display section 226 to notify the user of completion of the transmission of the pairing data, and hence it is possible to reliably notify the user that the transmission of the pairing data is completed.

The present invention has been described with reference to the embodiment, but the present invention is not limited to the above-described embodiment.

For example, the CPU 201 may determine whether or not the number of times of generation of a response success interrupt signal is equal to or larger than the generation count threshold value when a magnetic field detection interrupt signal is received.

Figure 9:
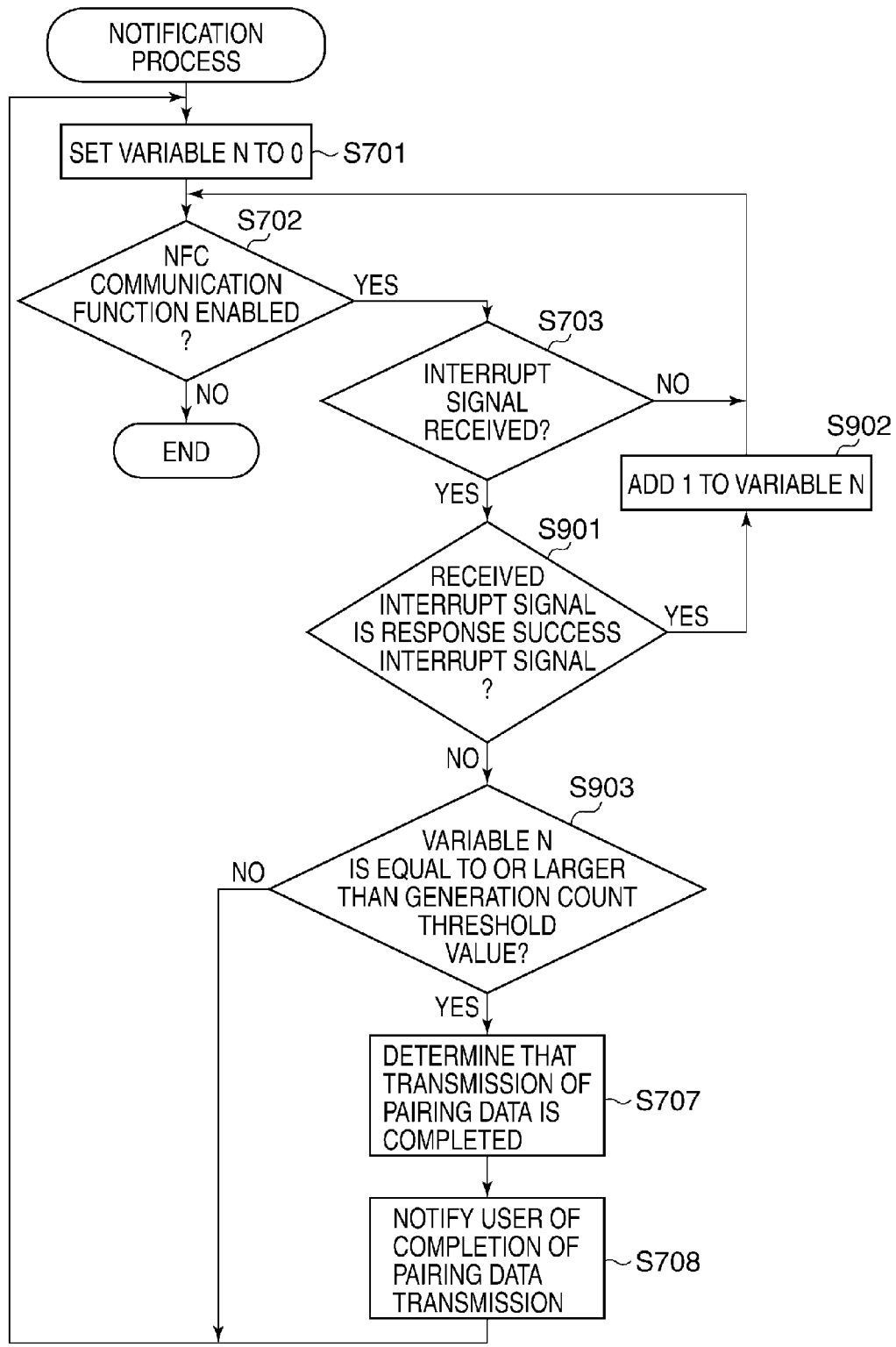
FIG. 9 is a flowchart of a first variation of the notification process.

FIG. 9 is a flowchart of a first variation of the notification process in FIG. 7.

The first variation of the notification process, shown in FIG. 9, is performed by the CPU 201 that executes the control program stored in the ROM 203 and the software stored in the HDD 204, and it is assumed in this process as well that the NFC tag controller 207 generates a magnetic field detection interrupt signal and a response success interrupt signal, based on the setting information set in advance. Further, it is assumed in this process as well that the step S603 in FIG. 6 has been executed and the generation count threshold value is stored in the RAM 202.

Referring to FIG. 9, first, the CPU 201 performs the same processing as in the steps S701 to S703 in FIG. 7.

If it is determined in the step S703 that an interrupt signal has been received from the NFC tag controller 207, the CPU 201 determines whether or not the received interrupt signal is a response success interrupt signal (step S901).

If it is determined in the step S901 that the received interrupt signal is a response success interrupt signal, the CPU 201 adds 1 to the variable N (step S902), and returns to the step S702.

If it is determined in the step S901 that the received interrupt signal is not a response success interrupt signal, for example, if the received interrupt signal is a magnetic field detection interrupt signal, the CPU 201 determines whether or not the variable N is equal to or larger than the generation count threshold value (step S903).

If it is determined in the step S903 that the variable N is smaller than the generation count threshold value, the CPU 201 judges that the transmission of the pairing data is not completed, and returns to the step S701, whereas if it is determined in the step S903 that the variable N is equal to or larger than the generation count threshold value, the CPU 201 executes the step S707 et seq. in FIG. 7.

If it is determined in the step S703 that an interrupt signal has not been received from the NFC tag controller 207, the CPU 201 returns to the step S702.

The above-described notification process in FIG. 9 can provide the same advantageous effects as provided by the notification process in FIG. 7. Note that in the above-described notification process in FIG. 7, it may be notified that the transmission of the pairing data has failed, based on the number of times of generation of a response success interrupt signal.

Figure 10:
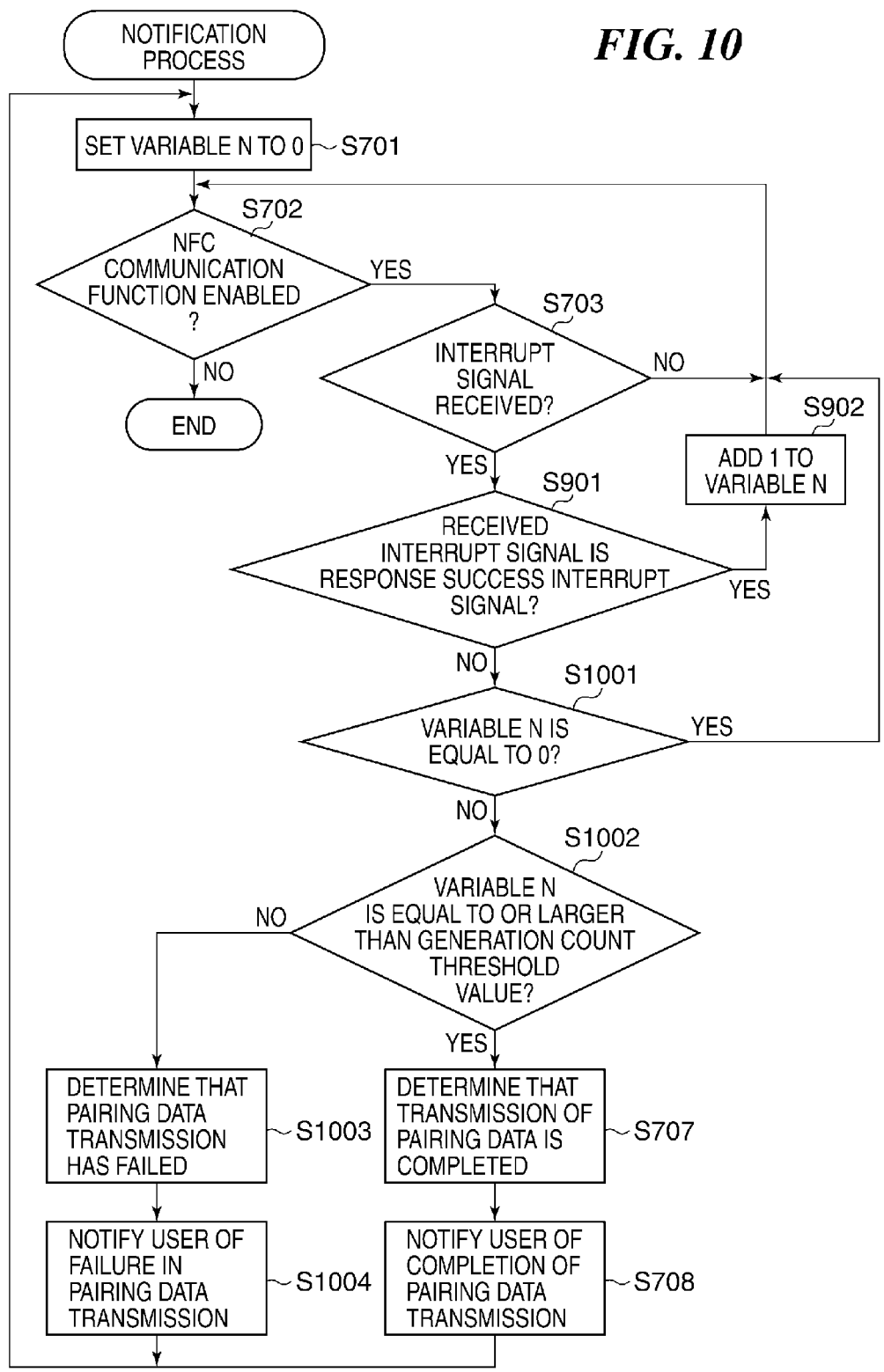
FIG. 10 is a flowchart of a second variation of the notification process.

FIG. 10 is a flowchart of a second variation of the notification process in FIG. 7.

The second variation of the notification process, shown in FIG. 10, is performed by the CPU 201 that executes the control program stored in the ROM 203 and the software stored in the HDD 204, and it is assumed in this process as well that the NFC tag controller 207 generates a magnetic field detection interrupt signal and a response success interrupt signal, based on the setting information set in advance. Further, it is assumed in this process as well that the step S603 in FIG. 6 has been executed and the generation count threshold value is stored in the RAM 202.

Referring to FIG. 10, first, the CPU 201 performs the same processing as in the steps S701 to S703 in FIG. 7 and the step S901 in FIG. 9.

If it is determined in the step S901 that the received interrupt signal is not a response success interrupt signal, for example, if the received interrupt signal is a magnetic field detection interrupt signal, the CPU 201 determines whether or not the variable N is equal to 0 (step S1001).

If it is determined in the step S1001 that the variable N is equal to 0, the CPU 201 returns to the step S702, whereas if the variable N is not equal to 0, the CPU 201 determines whether or not the variable N is equal to or larger than the generation count threshold value (step S1002).

If it is determined in the step S1002 that the variable N is equal to or larger than the generation count threshold value, the CPU 201 judges that the transmission of the pairing data is completed, and executes the step S707 et seq. in FIG. 7.

Figure 8B:
FIG. 8B is a diagram showing a display screen displayed on the display section, for notifying that the transmission of pairing data has failed.

If it is determined in the step S1002 that the variable N is smaller than the generation count threshold value, the CPU 201 judges that the transmission of the pairing data has failed (step S1003), displays a display screen 801 shown in FIG. 8B on the display section 226 to thereby notify the user that the transmission of the pairing data has failed (step S1004), and returns to the step S701.

If it is determined in the step S901 that the received interrupt signal is a response success interrupt signal, the CPU 201 performs the same processing as in the step S902 in FIG. 9.

According to the above-described process in FIG. 10, it is possible to notify a user of not only completion of transmission of the pairing data, but also incompletion of transmission of the pairing data, whereby it is possible to notify a user of a more detailed state of transmission of the pairing data.

Although in the above-described process in FIG. 7, a state of transmission of the pairing data is notified, a state of the configuration of communication settings based on the communication setting information contained in the pairing data may also be notified in addition to the state of transmission of the pairing data.

Figure 11A:
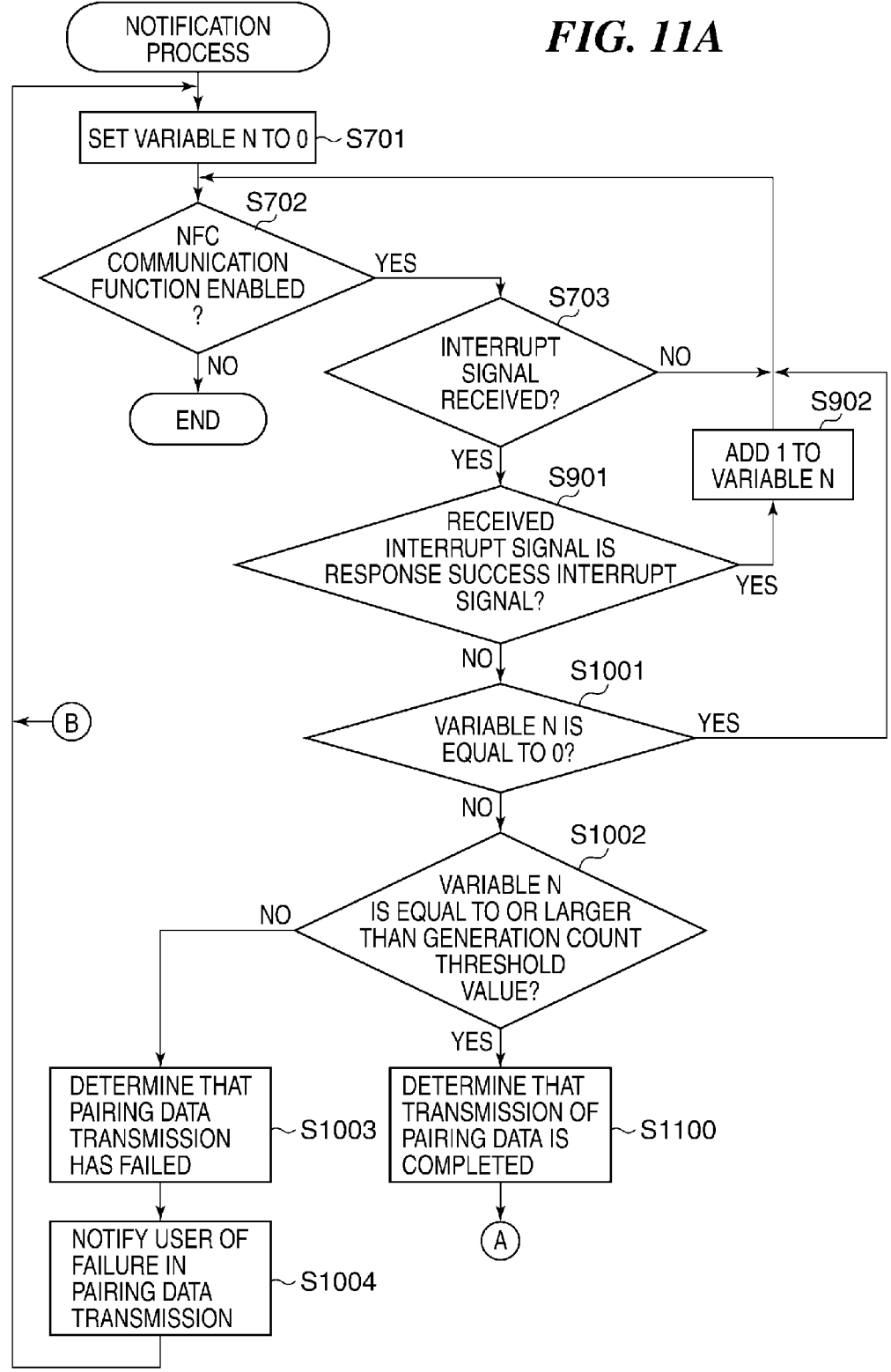
FIG. 11A is a flowchart of a third variation of the notification process.
Figure 11B:
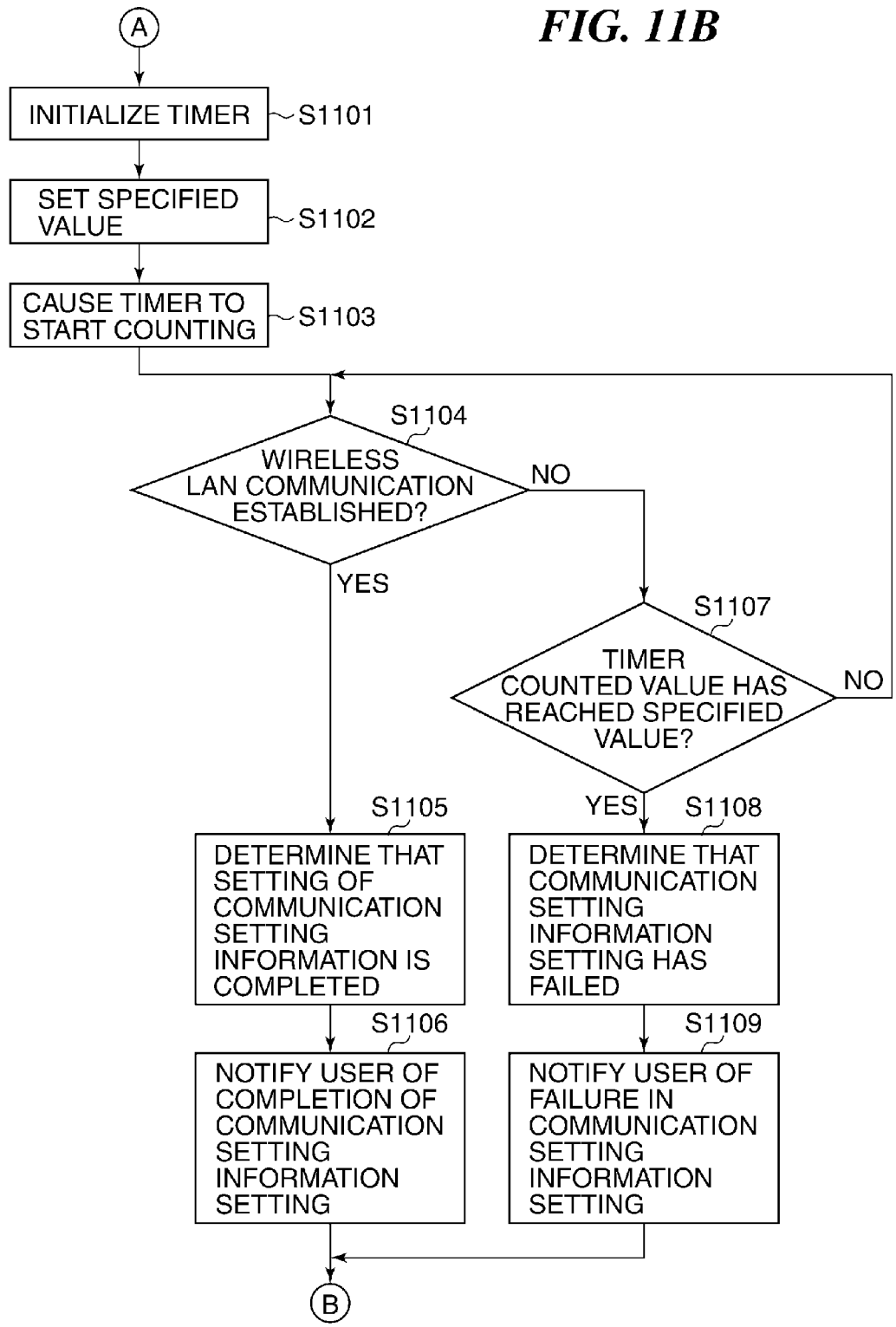
FIG. 11B is a continuation of FIG. 11A.

FIGS. 11A and 11B are a flowchart of a third variation of the notification process in FIG. 7.

The third variation of the notification process, shown in FIGS. 11A and 11B, is performed by the CPU 201 that executes the control program stored in the ROM 203 and the software stored in the HDD 204, and it is assumed in this process as well that the NFC tag controller 207 generates a magnetic field detection interrupt signal and a response success interrupt signal, based on the setting information set in advance. Further, it is assumed in this process as well that the step S603 in FIG. 6 has been executed, the generation count threshold value is stored in the RAM 202, and further, there is a case where the pairing data contains the communication setting information for configuring communication settings for the wireless LAN communication 106 which is different from the NFC communication 105.

Referring to FIGS. 11A and 11B, first, the CPU 201 performs the same processing as in the steps S701 to S703 in FIG. 7, the steps S901 and S902 in FIG. 9, and the steps S1001 and S1002 in FIG. 10.

If it is determined in the step S1002 that the variable N is equal to or larger than the generation count threshold value, the CPU 201 judges that the transmission of the pairing data is completed (step S1100), initializes the timer 213 (step S1101 in FIG. 11B), and sets the timer 213 to a specified value which is specified in advance (step S1102). Then, the CPU 201 causes the timer 213 to start counting (step S1103), and determines whether or not wireless LAN communication is established which is enabled by making communication settings based on the communication setting information contained in the pairing data (step S1104). In the step S1104, if a request for connecting the wireless LAN communication 106 is received from the mobile terminal 102 via the NFC communication 105, and a response to the connection request is made by the NFC tag controller 207, the CPU 201 judges that the wireless LAN communication is established, whereas if a request for connecting the wireless LAN communication 106 is not received from the mobile terminal 102 via the NFC communication 105, or if a response to the connection request is not made by the NFC tag controller 207 even when the communication request is received, the CPU 201 judges that the wireless LAN communication is not established.

If it is determined in the step S1104 that the wireless LAN communication is established, the CPU 201 judges that the configuration of communication settings based on the communication setting information is completed (step S1105), causes the timer 213 to stop counting, displays on the display section 226 a notification that the configuration of communication settings based on the communication setting information is completed (step S1106), and returns to the step S701.

If it is determined in the step S1104 that wireless LAN communication is not established, when the count value of the timer 213 reaches the specified value set in the step S1102 (YES to a step S1107), the CPU 201 judges that the configuration of communication settings based on the communication setting information has failed (step S1108), causes the timer 213 to stop counting, displays on the display section 226 a notification that the configuration of communication settings based on the communication setting information contained in the pairing data has failed (step S1109), and returns to the step S701.

If it is determined in the step S1002 that the variable N is smaller than the generation count threshold value, the CPU 201 executes the step S1003 et seq. in FIG. 10.

According to the above-described process in FIGS. 11A and 11B, it is determined whether or not the wireless LAN communication 106 is established based on the pairing data, and if it is determined that the wireless LAN communication 106 is established, it is judged that the configuration of communication settings based on the communication setting information is completed. Further, if it is determined that the wireless LAN communication 106 is not established during a time period after the number of times of generation of a response success interrupt signal becomes equal to the generation count threshold value and before a time period corresponding to the specified value elapses, it is judged that the configuration of communication settings based on the communication setting information has failed. Here, the case where the wireless LAN communication 106 is established is none other than a case where the configuration of communication settings has been performed based on the communication setting information for use in the configuration of communication settings for performing the wireless LAN communication 106, and further, the case where the wireless LAN communication 106 is not established even after the number of times of generation of a response success interrupt signal is equal to the generation count threshold value is none other than a case where the configuration of communication settings based on the communication setting information has not been performed. From the above, it is possible to reliably notify the user of the state of the configuration of communication settings based on the communication setting information transmitted via the NFC communication 105.

Next, a description will be given of a second embodiment of the present invention.

The second embodiment of the present invention is the same in configuration and operation as the above-described first embodiment, and differs from the first embodiment in that a write success interrupt signal, referred to hereinafter, is used, and hence the redundant description of the same configuration and operation as those of the first embodiment is omitted, and the following description will be given only of different points thereof.

FIG. 12 is a sequence diagram useful in explaining a process for transmitting pairing data via the NFC communication 105, which is performed between the MFP 101 as an information processing apparatus according to the second embodiment and the mobile terminal 102.

In FIG. 12, it is assumed that the NFC tag controller 207 of the MFP 101 generates a magnetic field detection interrupt signal and a write success interrupt signal described hereinafter, based on the setting information set in advance.

Referring to FIG. 12, first, the NFC tag controller 207 performs the same processing as in the steps S500 to S502 in FIG. 5, and then performs the same processing as in the step S504 without generating the response success interrupt signals. Then, when a write command is received from the mobile terminal 102 as a notification that reception of the pairing data is completed, the NFC tag controller 207 writes into the flash ROM 209 data indicative of completion of the transmission of the pairing data, based on the received write command. Then, when the data writing is completed, the NFC tag controller 207 transmits write response data indicating the completion of the data writing, to the mobile terminal 102 (step S1201). Further, the NFC tag controller 207 generates a write success interrupt signal (write completion notification) notifying completion of the transmission of the write response data, in accordance with the transmission of the write response data, and transmits the generated write success interrupt signal to the CPU 201 (step S1202). That is, in the present embodiment, whether or not the transmission of the pairing data is completed is determined using the write success interrupt signal. Then, the NFC tag controller 207 performs the same processing as in the step S506 in FIG. 5, followed by terminating the present process.

Figure 13:
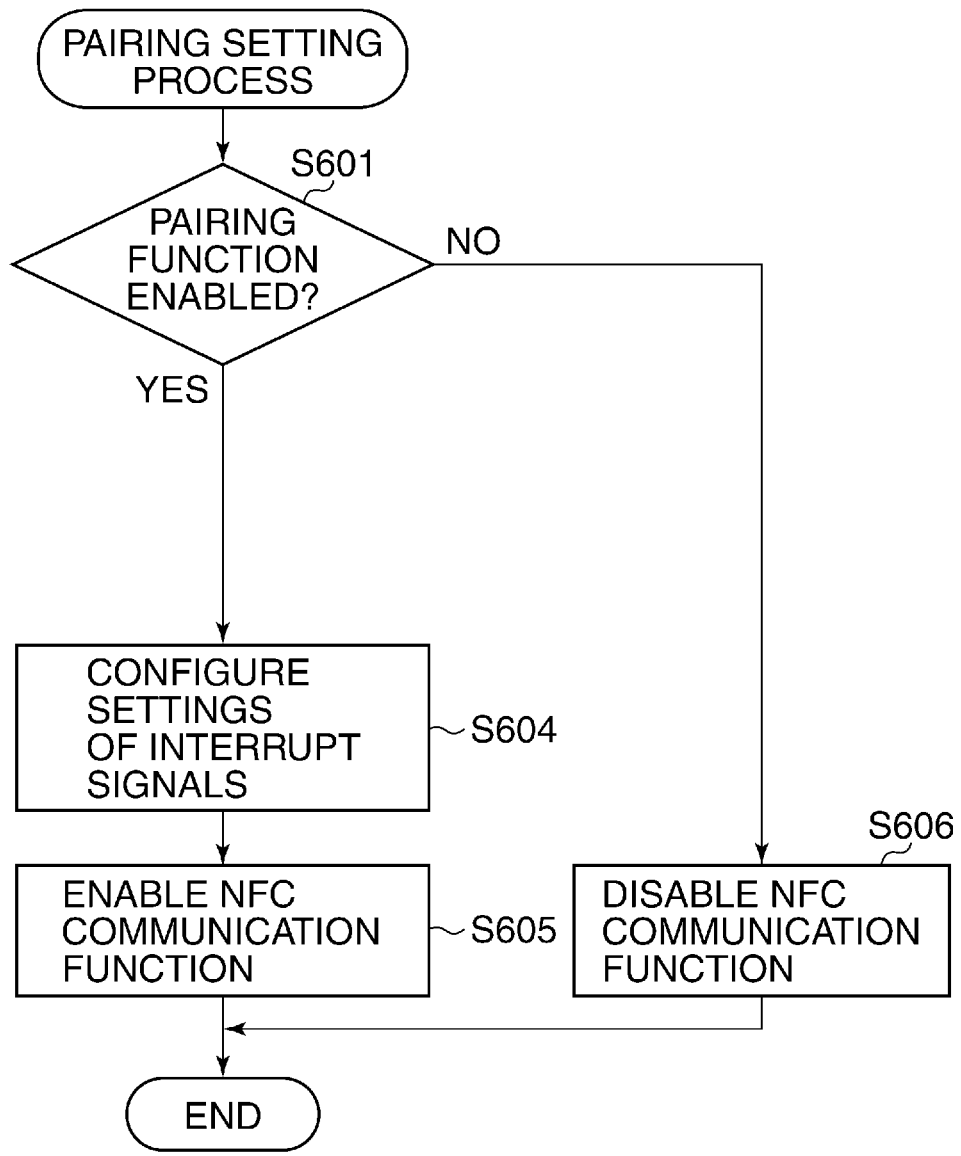
FIG. 13 is a flowchart of a pairing setting process performed by the MFP as the information processing apparatus according to the second embodiment.

FIG. 13 is a flowchart of a pairing setting process performed by the MFP 101 as the information processing apparatus according to the second embodiment.

The pairing setting process in FIG. 13 is performed by the CPU 201 that executes the control program stored in the ROM 203 and the software stored in the HDD 204, and it is assumed in this process as well that the NFC tag controller 207 of the MFP 101 generates a magnetic field detection interrupt signal and a write success interrupt signal, based on the setting information set in advance.

Referring to FIG. 13, first, the CPU 201 performs the same processing as in the step S601 in FIG. 6. If it is determined in the step S601 that the pairing function is enabled, the CPU 201 performs the same processing as in the step S604 et seq. in FIG. 6 without executing the step S603 in FIG. 6. That is, in the present embodiment, the generation count threshold value is not calculated. After that, the CPU 201 performs the same processing as in the step S605 in FIG. 6, followed by terminating the present process. Further, if it is determined in the step S601 that the pairing function is disabled, the CPU 201 performs the same processing as in the step S606 in FIG. 6, followed by terminating the present process.

Figure 14:
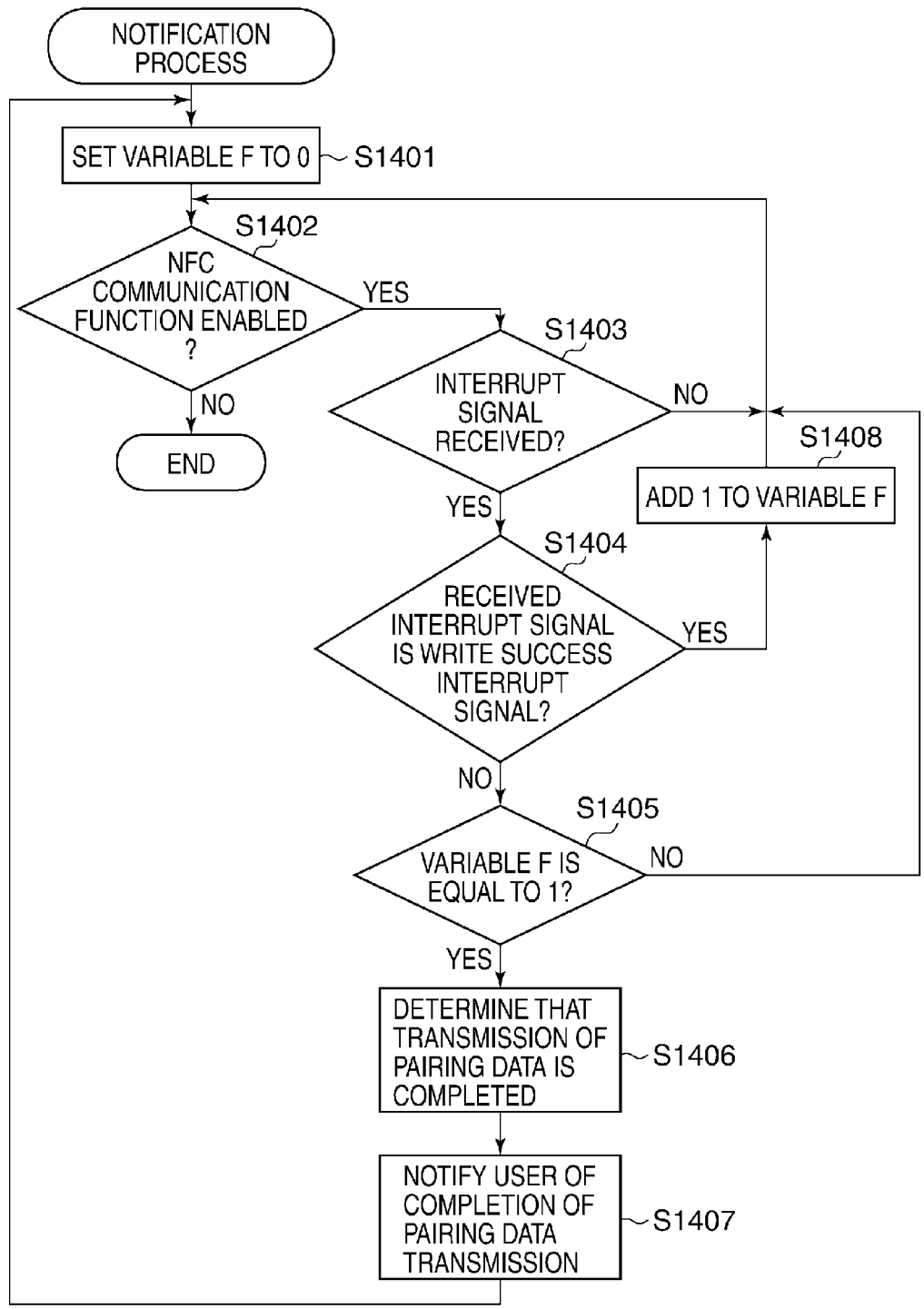
FIG. 14 is a flowchart of a notification process performed by the MFP as the information processing apparatus according to the second embodiment.

FIG. 14 is a flowchart of a notification process performed by the MFP 101 as the information processing apparatus according to the second embodiment.

The notification process in FIG. 14 is performed by the CPU 201 that executes the control program stored in the ROM 203 and the software stored in the HDD 204, and it is assumed in this process as well that the NFC tag controller 207 of the MFP 101 generates a magnetic field detection interrupt signal and a write success interrupt signal, based on the setting information set in advance.

Referring to FIG. 14, first, the CPU 201 sets a variable F indicative of the number of times of generation of a write success interrupt signal to 0 (step S1401). The variable F is set to 1 when a write success interrupt signal is generated. Then, the CPU 201 determines whether or not the NFC communication function of the NFC tag controller 207 is enabled (step S1402).

If it is determined in the step S1402 that the NFC communication function of the NFC tag controller 207 is enabled, the CPU 201 determines whether or not an interrupt signal has been received from the NFC tag controller 207 (step S1403).

If it is determined in the step S1403 that an interrupt signal has not been received from the NFC tag controller 207, the CPU 201 returns to the step S1402, whereas if it is determined in the step S1403 that an interrupt signal has been received from the NFC tag controller 207, the CPU 201 determines whether or not the received interrupt signal is a write success interrupt signal (step S1404).

If it is determined in the step S1404 that the received interrupt signal is not a write success interrupt signal, for example, if the received interrupt signal is a magnetic field detection interrupt signal, the CPU 201 determines whether or not the variable F is equal to 1 (step S1405).

If it is determined in the step S1405 that the variable F is not equal to 1, this indicates that a write success interrupt signal has not been generated, and hence the CPU 201 judges that the transmission of the pairing data is not completed, and returns to the step S1402.

If it is determined in the step S1405 that the variable F is equal to 1, this indicates that a write success interrupt signal has been generated, and hence the CPU 201 judges that the transmission of the pairing data is completed (step S1406), displays the display screen 800 on the display section 226 to thereby notify the user of completion of the transmission of the pairing data (step S1407), and returns to the step S1401.

If it is determined in the step S1404 that the received interrupt signal is a write success interrupt signal, the CPU 201 sets the variable F to 1 (step S1408), and returns to the step S1402.

If it is determined in the step S1402 that the NFC communication function of the NFC tag controller 207 is disabled, the CPU 201 terminates the present process.

According to the above-described notification process in FIG. 14, when a write command is transmitted from the mobile terminal 102, write response data to be transmitted to the mobile terminal 102 in response to the write command is generated, and a write success interrupt signal corresponding to the write response data is generated. When a magnetic field generated by the NFC communication 105 is detected, if the write success interrupt signal has been generated, it is judged that the transmission of the pairing data is completed, and a notification that the transmission of the pairing data is completed is displayed. This makes it possible to reliably notify the user that the transmission of the pairing data is completed.

Although in the above descriptions given with reference to FIGS. 7, 9, 10, 11A, 11B, and 14, the state of transmission of the pairing data or the state of configuration of communication settings based on the communication setting information is notified by displaying e.g. the display screen 800 or 801 on the display section 226, notification means is not limited to the display section 226, but the LED 224 or the loudspeaker 225 may be used. For example, completion of the transmission of the pairing data may be notified by lighting and flashing the LED 224, or by causing the loudspeaker 225 to output a voice saying that the transmission of the pairing data is completed. Further, in the above descriptions given with reference to FIGS. 7, 9, 10, 11A, 11B, and 14, notification may be performed using at least one of the notification means of the LED 224, the loudspeaker 225, and the display section 226, or a user may set which of the notification means is to be used.

While the present invention has been described with reference to exemplary embodiments, it is to be understood that the invention is not limited to the disclosed exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087663 filed Apr. 22, 2015, which is hereby incorporated by reference herein in its entirety.

What is claimed is:

1. An information processing apparatus comprising:
a short-range wireless communication unit configured to perform short-range wireless communication, wherein said short-range wireless communication unit holds data and transmits the data to an external apparatus by dividing the data;
a detection unit configured to detect an interrupt signal generated by said short-range wireless communication unit, the interrupt signal indicating that said short-range wireless communication unit has transmitted a divided data item of the data to the external apparatus; and
a notification unit configured to notify a user that transmission of the data is completed, in a case where the number of times of detection of the interrupt signal by said detection unit reaches a predetermined number of times.

2. The information processing apparatus according to claim 1, further comprising a determination unit configured to determine the number of times of detection of the interrupt signal, at which it is regarded that transmission of the data is completed, based on a size of the data held by said short-range wireless communication unit, and
wherein in a case where the number of times of detection of the interrupt signal by said detection unit reaches the number of times determined by said determination unit, said notification unit notifies the user that transmission of the data is completed.

3. The information processing apparatus according to claim 1, wherein in a case where said notification unit notifies the user that transmission of the data is completed, the number of times of detection of the interrupt signal by said detection unit is set to 0.

4. The information processing apparatus according to claim 1, wherein in a case where said detection unit detects another interrupt signal different from the interrupt signal, the number of times of detection of the interrupt signal by said detection unit is set to 0.

5. The information processing apparatus according to claim 4, wherein the other interrupt signal is an interrupt signal indicating that said short-range wireless communication unit has detected a magnetic field.

6. The information processing apparatus according to claim 1, wherein said notification unit displays a notification screen for notifying the user that transmission of the data is completed.

7. The information processing apparatus according to claim 1, wherein said notification unit notifies the user that transmission of the data is completed, by using an LED provided in the information processing apparatus.

8. The information processing apparatus according to claim 1, wherein said notification unit notifies the user that transmission of the data is completed, by using a loudspeaker provided in the information processing apparatus.

9. The information processing apparatus according to claim 1, wherein the short-range wireless communication is wireless communication based on NFC.

10. The information processing apparatus according to claim 1, wherein the information processing apparatus is a printer that performs print processing.

11. A method of controlling an information processing apparatus including a short-range wireless communication unit configured to hold data and perform short-range wireless communication, comprising:

transmitting the data to an external apparatus by dividing the held data;

detecting an interrupt signal generated by the short-range wireless communication unit, the interrupt signal indicating that the short-range wireless communication unit has transmitted a divided data item of the data to the external apparatus; and notifying a user that transmission of the data is completed, in a case where the number of times of detection of the interrupt signal reaches a predetermined number of times.

12. A non-transitory computer-readable storage medium storing a computer-executable program for executing a method of controlling an information processing apparatus including a short-range wireless communication unit configured to hold data and perform short-range wireless communication, wherein the method comprises:

transmitting the data to an external apparatus by dividing the held data;

detecting an interrupt signal generated by the short-range wireless communication unit, the interrupt signal indicating that the short-range wireless communication unit has transmitted a divided data item of the data to the external apparatus; and notifying a user that transmission of the data is completed, in a case where the number of times of detection of the interrupt signal reaches a predetermined number of times.

* * * * *